United States Patent [19]

Katzmark

[11] Patent Number: 4,688,696

[45] Date of Patent: Aug. 25, 1987

[54] INJECTION-MOLDED ENCLOSURES

[76] Inventor: Peter C. Katzmark, 1102 W. 186th St., Gardena, Calif. 90248

[21] Appl. No.: 801,742

[22] Filed: Nov. 26, 1985

[51] Int. Cl.⁴ .................. B65D 43/04; B65D 43/08
[52] U.S. Cl. ................................................. 220/352
[58] Field of Search ............. 220/352, 307, DIG. 19

[56] References Cited

U.S. PATENT DOCUMENTS 4,499,353  2/1985  Shields ........................... 220/352

Primary Examiner—George T. Hall
Attorney, Agent, or Firm—Kendrick, Netter & Bennett

[57] ABSTRACT

An injection-molded enclosure made of rigid thermoplastic material includes a first part having at its periphery a wall with an inwardly, downwardly slanted inner surface and a second container portion having an inwardly, downwardly slanted periphery. The first and second parts engage with, and disengage from one another when the first and second parts are pressed together.

4 Claims, 5 Drawing Figures

INJECTION-MOLDED ENCLOSURES

This invention relates to any injection-molded, two-part enclosures where the two parts must engage with, and disengage from one another without fasteners and without snap-fitting locking beads or rims on either part. More particularly, the invention relates to injection-molded enclosures, such as containers, made of rigid plastic material such as general purpose styrene, and including at least two parts intended to engage with, and disengage from one another. One part has, at its periphery, locking means comprising a wall with an inwardly, downwardly slanted inner surface. The second part has, at its periphery, an inwardly, downwardly slanted edge complementary to the inner wall surface on the first part. The second part can be removably seated against the inner wall surface on the first part by pressing the periphery of the second part onto this inner surface.

Neither the first nor the second part needs to have any bead, lip or other locking means to hold the two parts together. As a result, both the first and second parts can be injection-molded from rigid, thermoplastic material such as general purpose styrene. Until now, two-part, injection-molded, plastic enclosures had to be made of more costly, flexible plastics to permit formation and removal from injection molds of parts carrying beads to other snap-fit locking mechanisms on their peripheries.

This invention ca better be understood by reference to the accompanying drawings in which.

Figure 1:
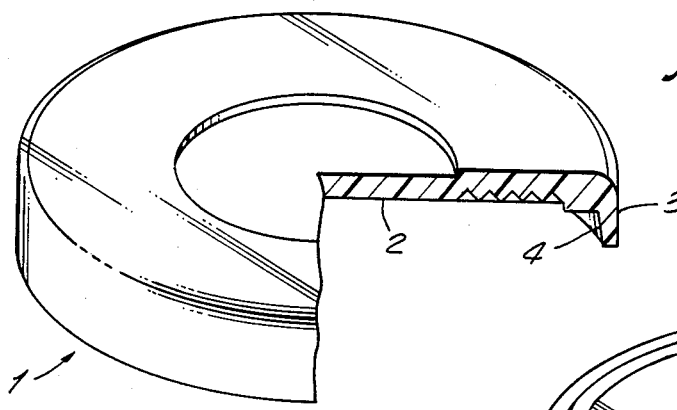
FIG. 1 is a perspective view of the first part of a two-part, injection-molded container having non-snap-fit locking means on the inner surface of a wall at the periphery of this part.

FIG. 1 shows an injection-molded, first container part, generally designated 1, having a flat inner surface 2 and, at its periphery, an upstanding wall 3. Inner surface 4 on wall 3 has an inwardly, downwardly slanted profile adapted to engage with, and disengage from the complementary structure a the periphery of the second injection-molded container part shown in FIG. 2.

Figure 3:
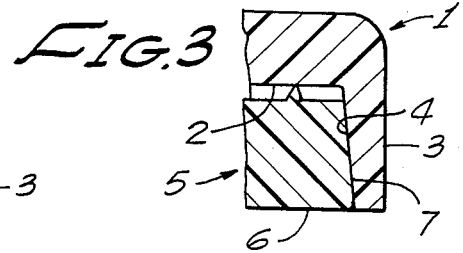
FIG. 3 shows the first and second container parts from FIGS. 1 and 2 engaged with one another.
Figure 2:
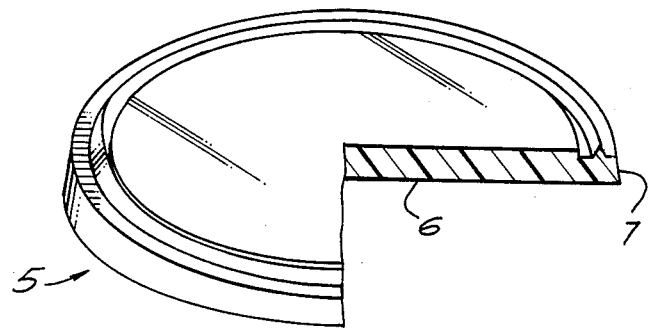
FIG. 2 is a perspective view of a second injection-molded container part, complementary with the first part shown in FIG. 1, and having at its periphery an inwardly, downwardly slanted edge that can lockingly engage with, and disengage from the inner wall surface at the periphery of the first part.

FIG. 2 shows an injection-molded, second container part 5, complementary with container part 1. Container part 5 has a flat inner surface 6 and, at its periphery, inwardly, downwardly slanted edge portion 7. Container part 5 fits into and engages container part 1, with the peripheral edge portion 7 on container part 5 seating against the downwardly, inwardly slanted inner surface 4 on wall 3, as FIG. 3 shows.

No bead or other snap-fit locking feature appears on either injection-molded part 1 or injection-molded container part 5. Accordingly, container parts 1 and 5 can be engaged with, and disengaged from one another repeatedly without damaging or destroying the locking feature at the periphery of these container parts.

Figure 4:
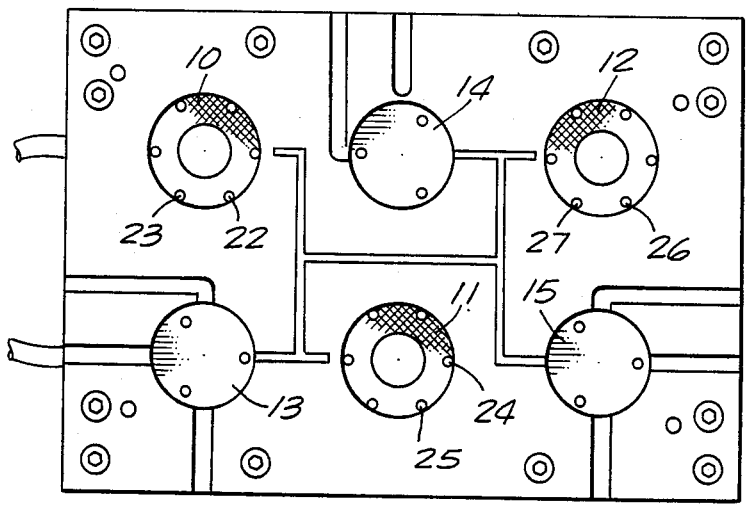
FIG. 4 is a plan view of one half of an injection mold for making the first and second container parts shown in FIGS. 1 and 2.
Figure 5:
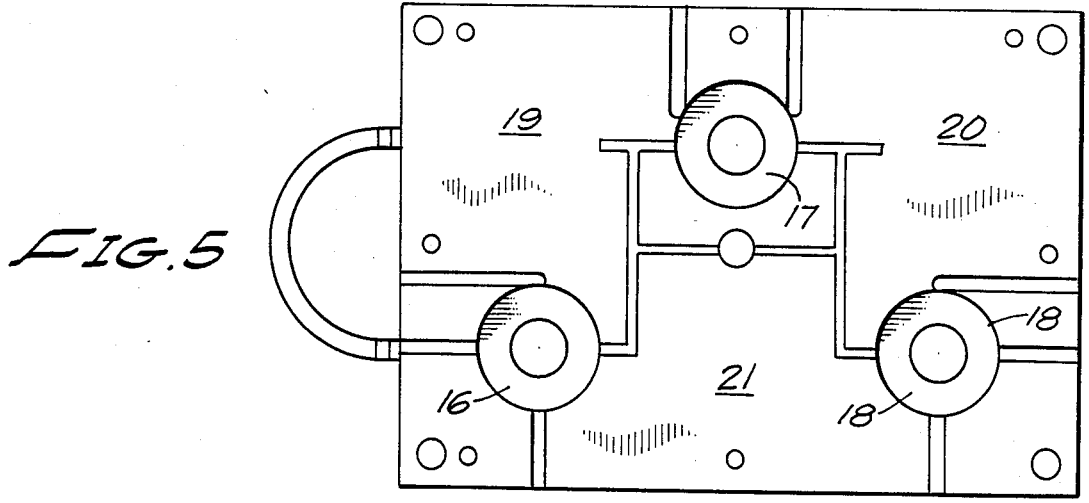
FIG. 5 is a plan view of other half of the injection mold shown in FIG. 4.

FIGS. 4 and 5 show the two halves of an injection mold suitable for making the injection-molded first and second container parts shown in FIGS. 1 and 2. Fig. 4 shows three cores 10, 11 and 12 for injection-molding the first container part shown in FIG. 1, and three cavities 13, 14 and 15 for injection-molding the second container part shown in FIG. 2.

FIG. 5 shows the complementary mold half to the mold half shown in FIG. 4. Fig. 5 shows cavities 16, 17 and 18 that are complementary to and mate with cores 10, 11 and 12 in the injection mold half shown in FIG. 4. FIG. 5 also shows mold plate surfaces 19, 20 and 21 that mate with cavities 13, 14 and 15 in the mold half shown in FIG. 4. Since the cores shown in FIG. 3 form no beveled edges or snap-fit rims on parts formed in these cavities, the mold-ejector pins such as pins 22, 23, 24, 25, 26 and 27 shown in FIG. 4 readily push mold parts formed in these cores from the mold without cracking or breaking the molded part If the first and second container parts shown in FIG. 1 were molded with beads or snap-fit rims at their periphery, they would not release from the core of the injection mold shown in Figs. 4 and 5 without cracking or breaking because the peripheral beads or other locking means would, in the injection-molded first container part, form over a metal projection at the edge of the part cavities in the core. This invention permits the injection molding of plastic parts that interlock without snap-fit locking means and permits the use of high optical clarity, low cost plastics for injection-molded enclosures and other molded parts.

What is claimed is:

1. An injection-molded, rigid, thermoplastic enclosure comprising at least two complementary parts, each part having non-snap-fit locking means at its periphery, said locking means comprising, on the first container part, a wall having a downwardly, inwardly slanted inner wall surface and, on the second container part, a downwardly, inwardly slanted periphery that releasably engages with, and disengages from, said inner wall surface on said first container part when said second part is seated in said first part.

2. An injection-molded, rigid, thermoplactic article comprising at least two complementary parts that are releasably engageable with and disengageable from one another without snap-fit locking means at the periphery of either of said two parts, said two complementary parts including locking means comprising on the first of said parts, wall means having a downwardly, inwardly slanted inner surface, and, on the second of said complementary parts, a downwardly, inwardly-slanted edge surface that releasably engages with, and disengages from, said inner wall surface on said first part when said second part is engaged with said first part.

3. An injection-molded, rigid, thermoplastic enclosure comprising at least two complementary parts that are releasably engageable with and disengageable from one another without snap-fit locking means at the periphery of either of said two parts, the first of said parts comprising a substantially flat member with an upstanding wall at its periphery, said wall having a downwardly, inwardly slanted inner wall surface, the second of said parts comprising a substantially flat member that fits into and releasably engages with said first part, said second part having a downwardly, inwardly slanted edge that releasably engages with, and disengages from, said inner wall surface on said first part when said second part is engaged with said first part.

4. The injection-molded, rigid, thermoplastic enclosure of claim 3 wherein the first of said parts is a round planar member having a substantially flat outer surface and a substantially flat inner surface, and the second of said parts is a round planar member having substantially flat inner and outer surfaces.

* * * * *